United States Patent
Yim et al.

(10) Patent No.: US 6,259,748 B1
(45) Date of Patent: Jul. 10, 2001

(54) SIGNAL OFFSET ELIMINATION

(75) Inventors: Terence W Yim, Guildford; Natividade Albert Lobo, Windsor, both of (GB)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 08/994,724

(22) Filed: Dec. 19, 1997

(30) Foreign Application Priority Data

Dec. 31, 1996 (GB) .................................................. 9627082

(51) Int. Cl.[7] .............................. H03D 3/22; H04L 27/22
(52) U.S. Cl. ........................... 375/329; 375/332; 329/304
(58) Field of Search .................................... 375/259, 261, 375/316, 317, 319, 340, 341, 346, 329, 332, 279, 280; 329/304–307

(56) References Cited

U.S. PATENT DOCUMENTS

| | | | |
|---|---|---|---|
| 4,180,779 | 12/1979 | Hook et al. | 329/50 |
| 4,973,923 | 11/1990 | Kuisma | 332/117 |
| 5,091,919 | 2/1992 | Kuisma | 375/60 |
| 5,124,672 | 6/1992 | Kuisma | 332/103 |
| 5,142,552 * | 8/1992 | Tzeng et al. | 375/231 |
| 5,231,364 | 7/1993 | Mucke | 332/105 |
| 5,311,151 | 5/1994 | Vaisanen | 332/105 |
| 5,357,221 | 10/1994 | Matero | 332/123 |
| 5,371,481 | 12/1994 | Tiittanen et al. | 332/103 |
| 5,392,460 | 2/1995 | Mattila et al. | 455/76 |
| 5,442,655 * | 8/1995 | Dedic et al. | 375/340 |
| 5,446,422 | 8/1995 | Mattila et al. | 332/103 |
| 5,469,126 | 11/1995 | Murtojarvi | 332/105 |
| 5,495,510 | 2/1996 | Kimiavi | 375/371 |
| 5,574,751 * | 11/1996 | Trelewicz | 375/265 |
| 5,657,355 * | 8/1997 | Reusens | 375/340 |
| 5,659,578 * | 8/1997 | Alamouti et al. | 375/261 |
| 5,678,224 | 10/1997 | Murtojarvi | 455/326 |
| 5,706,057 * | 1/1998 | Strolle et al. | 348/426 |
| 5,828,705 * | 10/1998 | Kroeger et al. | 375/326 |

FOREIGN PATENT DOCUMENTS

| | | |
|---|---|---|
| 0607063 A1 | 7/1994 | (EP) . |
| 2265282 | 9/1993 | (GB) . |

OTHER PUBLICATIONS

Communication Systems Wiley, 3rd Edition, Simon Haykin, Chapter 8.

Critchlow, D.L., "DC Restoration Technique For Duobinary Transmission Through Band–Pass Channel", IBM Technical Disclosure Bulletion, US, IBM Corp., New York, vol. 12, no. 3, Aug. 1969, 1 p.

* cited by examiner

*Primary Examiner*—Chi Pham
*Assistant Examiner*—Jean B Corrielus
(74) *Attorney, Agent, or Firm*—Perman & Green, LLP

(57) ABSTRACT

A method of estimating the DC offset and the phase offset for a radio receiver operable in a digital passband transmission system, the method comprising; sampling a received radio signal at the symbol rate of the transmission system to produce a set of data samples, processing each data sample in the set in order to determine a received signal point in signal space for each data sample, determining an associated constellation point in signal space for each received signal point, calculating the DC offset and the phase offset which minimises, for the set of data samples, the sum of the square of the random errors between each received signal point and its associated constellation point.

26 Claims, 6 Drawing Sheets

SIGNAL OFFSET ELIMINATION

FIELD OF THE INVENTION

The present invention relates to a method for estimating the DC offset and the phase offset for a radio receiver operable in a digital passband transmission system.

DESCRIPTION OF THE PRIOR ART

FIG. 1 shows a general arrangement of a known digital passband transmission system in which a data source 10 emits a data symbol $m_n$ periodically every T seconds. The rate at which symbols are generated, transmitted and received in the system remains constant and is equal to 1/T, the symbol rate. An encoder 11 operates on the output ($m_0$, $m_1$, $m_2$, ... ) of the data source 10 by encoding each data symbol $m_n$ into a constellation point $s_n$, which may be represented geometrically in signal space. The number of distinct possible constellation points is finite, and the set of constellation points which correspond to the set of possible data symbols is known as the signal constellation. For each generated constellation point $s_n$, a modulator 12 constructs a distinct modulated signal $s_n(t)$ of duration T seconds as the representation of the data symbol $m_n$. An antenna 13 of the transmitter then transmits, in series, each modulated signal $s_n(t)$ on a communications channel of the transmission system. A receiver operating in the digital passband transmission system receives via an antenna 14 each of the transmitted signals $s_n(t)$ as a received signal $r_n(t)$ for a duration of T seconds. In other words, the receiver samples the received radio signal at the symbol rate of the transmission system to produce a series of data samples or received signals $r_n(t)$. The task of the receiver is to reproduce the series of emitted data symbols $m_n$ by processing the series of received signals $r_n(t)$. This is accomplished in two stages. The first stage is a detector 15 that operates on the received signal $r_n(t)$ for a duration of T seconds to produce an observation or received signal point $r_n$ which, like the constellation point, may be represented geometrically in signal space. A decoder 16 constitutes the second stage of the receiver and performs a decision making process on the received signal point $r_n$ to produce an estimate $m'_n$ of the original message signal $m_n$. The encoding and modulating process which occurs in the transmitter of FIG. 1 typically involves switching (keying), for example, the phase of a carrier wave 17 in some fashion in accordance with the incoming data samples $m_n$.

A further discussion of digital passband transmission systems may be found in chapter 8 of "Communication Systems", Wiley, 3rd Edition, by Simon Haykin.

A popular type of digital passband data transmission used in cellular telephone systems is M-ary phase shift keying (MPSK) or more specifically quadrature phase shift keying (QPSK). A known QPSK transmitter is shown in FIG. 2. Each message $m_n$ emitted from the data source 10 is converted into a constellation point $s_n$ defined in the QPSK system by the two quadrature signals $s_n[I]$ and $s_n[Q]$. The two quadrature signals modulate two orthonormal carrier waves which have the same frequency $\omega_c$ but differ in phase by 90°. These two modulated signals $s_n(t)[I]$ and $s_n(t)[Q]$ are then summed to produce the transmission signal $s_n(t)$. FIG. 3 shows a known QPSK receiver which may receive each transmitted signal $s_n(t)$ as a received signal $r_n(t)$. The received signal $r_n(t)$ is then fed into an I correlator 31 which retrieves the I component $r_n[I]$ of the received signal, and a Q correlator 32 which retrieves the Q component $r_n[Q]$ of the received signal. The signals $r_n[I]$ and $r_n[Q]$ define the received signal point $r_n$.

The constellation points $s_n$ and the received signal point $r_n$ of the QPSK system may be plotted in a signal space diagram with the x axis representing the in-phase I component and the y axis representing the $\pi/2$ out-of-phase quadrature Q component. FIG. 4 is an example of a signal space diagram showing a set of four received signal point $r_1$, $r_2$, $r_3$, and $r_4$ and their associated constellation points $s_1$, $s_2$, $s_3$, and $s_4$.

In digital passband transmission systems employing MPSK and QPSK modulation schemes, it is known for a received signal point $r_n$ to deviate from its associated constellation point $s_n$. This may be the result of random errors which typically occur due to noise components being added to the transmission signal $s_n(t)$ in the communications channel. Deviation of the received signal points may also be the result of systematic errors present in the received signal points $r_n$. These systematic errors may be the result of a phase offset in the transmission system which rotates each of the received signal points in signal space. The systematic errors may also be the result of a DC offset in the transmission system which translates each of the received signal points in signal space.

The total DC offset present in the received signal points $r_n$ may be the result of a combination of DC offset sources, such as:

a) The base band (data source and encoder) of the transmitter producing a DC offset.
b) Intermediate frequency or carrier residue at the transmitter.
c) Intermediate frequency or carrier residue at the receiver.
d) The base band of the receiver producing a DC offset.
e) Interference from a system clock appearing as a DC offset superimposed on a particular channel.

Deviation of a received signal point $r_n$ from its associated constellation point $s_n$ can be detrimental to the performance of the receiver. Optimisation of the receiver helps to reduce the deviation so that the decoder 16 can perform the decision making process more accurately. Optimisation may involve improving the signal-to-noise ratio so that the random error component in the deviation resulting from noise is reduced. Optimisation may also involve reducing the systematic errors in the deviation by estimating the systematic errors in the system and then eliminating the estimated systematic error from the received signal.

A known method for estimating the DC offset in a receiver is to average the received signal points $r_n$ in the base band of the receiver to obtain a value for the complex DC offset. For example, the I components $r_n[I]$ of the received signal points may be added together and the sum divided by the number of samples to yield an estimation for the I component of the DC offset, and the Q components $r_n[Q]$ of the received signal points may be added together and the sum divided by the number of samples to yield an estimation for the Q component of the DC offset. In order for the method to yield an accurate estimation for the DC offset, the number of received signal points N must be large enough to significantly reduce the random errors in the received signal points. Also, to avoid any biasing errors, the method depends on the set of original constellation points associated with the set of received signal points averaging substantially to zero.

SUMMARY OF THE INVENTION

According to a first aspect of the present invention there is provided a method of estimating the DC offset and the phase offset for a radio receiver operable in a digital passband transmission system, the method comprising; sampling a received radio signal at the symbol rate of the transmission system to produce a set of data samples, processing each data sample in the set in order to determine a received signal point in signal space for each data sample, determining an associated constellation point in signal space for each received signal point, calculating the DC offset and the phase offset which minimises, for the set of data samples, the sum of the square of the errors between each received signal point and its associated constellation point.

According to a second aspect of the present invention there is provided a method of estimating the DC offset for a radio receiver operable in a digital passband transmission system, the method comprising; sampling a received radio signal at the symbol rate of the transmission system to produce a set of data samples, processing each data sample in the set, in order to determine a received signal point in signal space for each data sample, determining an associated constellation point in signal space for each received signal point, calculating the DC offset which minimises, for the set of data samples, the sum of the square of the errors between each received signal point and its associated constellation point.

According to a third aspect of the present invention there is provided a method of estimating the phase offset for a radio receiver operable in a digital passband transmission system, the method comprising; sampling a received radio signal at the symbol rate of the transmission system to produce a set of data samples, processing each data sample in the set in order to determine a received signal point in signal space for each data sample, determining an associated constellation point in signal space for each received signal point, calculating the phase offset which minimises, for the set of data samples, the sum of the square of the errors between each received signal point and its associated constellation point.

In a preferred embodiment the radio receiver is a phase-shift keying radio receiver.

Preferably the step of processing comprises processing each data sample using a bank of correlators. The bank of correlators may have a common input and the resultant correlator outputs may define the received signal points in signal space. The bank of correlators may comprise an in-phase I correlator and a quadrature Q correlator. Alternatively, the bank of correlators may be a bank of matched filters instead.

In a preferred embodiment the radio receiver is a quadrature phase-shift keying (QPSK) radio receiver.

In one embodiment, prior knowledge of information contained in the received radio signal is used to determine an associated constellation point for each received signal point. This may occur when the receiver is expecting a known sequence of message symbols to be transmitted by the transmitter and consequently knows in advance the associated constellation point for each received signal point.

In another embodiment, a decision aided process, performed by the decoder 16, is used to determine an associated constellation point for each received signal point. In this embodiment the method may be performed when the signal-to-noise ratio is high to ensure that the decision aided process operates accurately.

According to a fourth aspect of the present invention there is provided a method of estimating the DC offset for a radio receiver operable in a digital passband transmission system, using an algorithm implementing the equation;

$$u = \frac{N\sum_{n=0}^{N-1} r_n - \sum_{n=0}^{N-1} r_n \bar{s}_n \sum_{n=0}^{N-1} s_n}{N^2 - \left|\sum_{n=0}^{N-1} s_n\right|^2}$$

where u represents the DC offset, $r_n$ represents the set of received signal points corresponding to a received signal sampled at the symbol rate, $s_n$ represents the set of constellation points associated with the set of received signal points, and N is the number of samples performed on the received signal.

According to a fifth aspect of the present invention there is provided a method of estimating the phase offset for a radio receiver operable in a digital passband transmission system, using an algorithm implementing the equation;

$$\psi = \mathrm{Arg}\left[\frac{N\sum_{n=0}^{N-1} r_n \bar{s}_n - \sum_{n=0}^{N-1} r_n \sum_{n=0}^{N-1} s_n}{N^2 - \left|\sum_{n=0}^{N-1} s_n\right|^2}\right]$$

where $\psi$ is an angle representing the phase offset, $r_n$ represent the set of received signal points corresponding to a received signal sampled at the symbol rate, $s_n$ represent the set of constellation points associated with the set of received signal points, and N is the number of samples performed on the received signal.

An advantage in accordance with the invention is that an accurate estimate may be made of the phase offset and/or the DC offset in the receiver using a relatively small number of received signal points. Hence, the estimation may be made accurately in a short period of time with simple processing. The method in accordance with the invention may be performed on a set of received signal points where the associated constellation points do not average to zero. This provides a significant advantage over the prior art method.

Advantageously, the method in accordance with the invention may use known short data patterns which already exist in the transmission system. This applies to most transmission systems that transmit short known patterns periodically for house keeping purposes. In this case no extra bandwidth is wasted by using the method in accordance with the invention.

Advantageous in the methods according to the fourth and fifth aspects of the present invention the terms:

$$\sum_{n=0}^{N-1} s_n \quad \text{and} \quad \frac{1}{N^2 - \left|\sum_{n=0}^{N-1} s_n\right|^2}$$

may be precalculated and stored in a look-up table in the receiver in order to reduce the processing required, particularly when the method is performed more than once in the receiver.

Ideally the set of received signal point $r_n$ have frequency and symbol timing error corrected for.

In a preferred embodiment in accordance with the invention the receiver estimates the DC offset (in both I and Q path) of the received signal at base band. The undesirable effect of the DC offset on the receiver performance can then be eliminated by performing the reverse transformation of the offsets on the received signal point.

The systematic errors present in transmission system may change from time to time. Therefore, it is preferable to periodically calibrate or optimise the receiver by estimating the DC offset and phase offset using the method in accordance with the invention and then eliminating the offsets in the received signals. Changes to the systematic errors may be caused by sudden temperature changes or by ageing of components in the receiver. Changes to the systematic errors may also be caused by the receiver locking to a different transmitter.

BRIEF DESCRIPTION OF THE DRAWINGS

Embodiments of the invention will now be described, by way of example, with reference to the appended figures, in which.

DETAILED DESCRIPTION OF THE INVENTION

A preferred embodiment in accordance with the invention will be described with reference to a digital passband transmission system incorporating the QPSK modulation scheme. The receiver is preferably a receiver of a mobile cellular telephone operating in a cellular telephone network.

Figure 1:
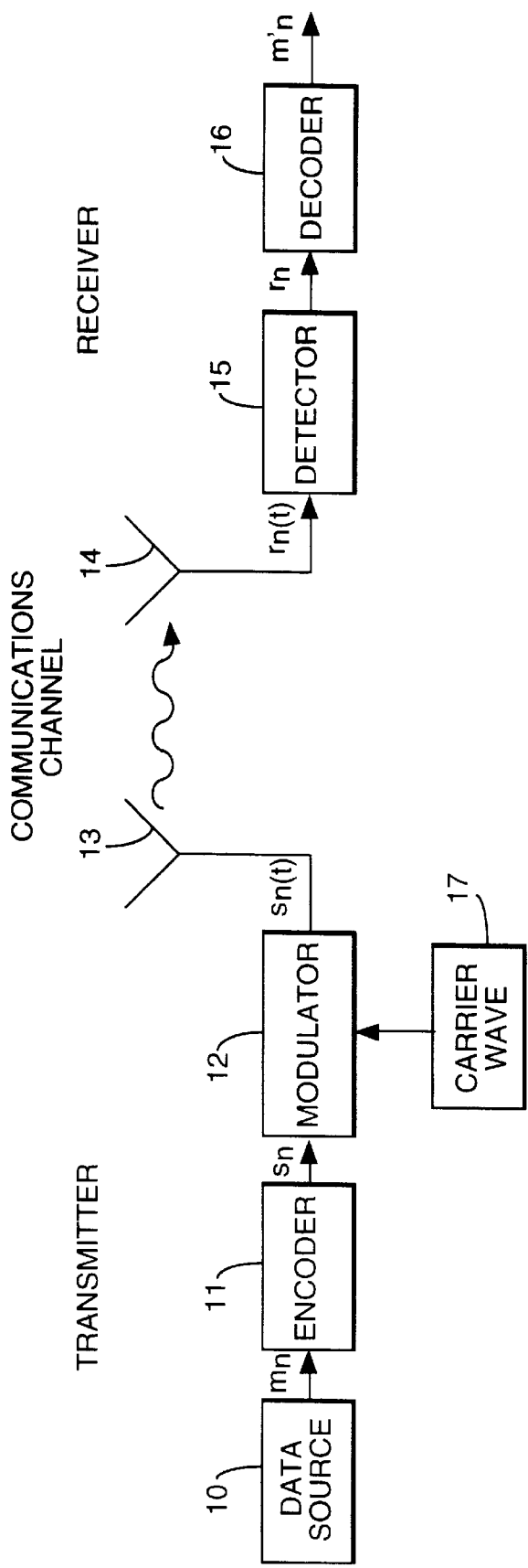
FIG. 1 is a diagram of a digital transmission system.
Figure 2:
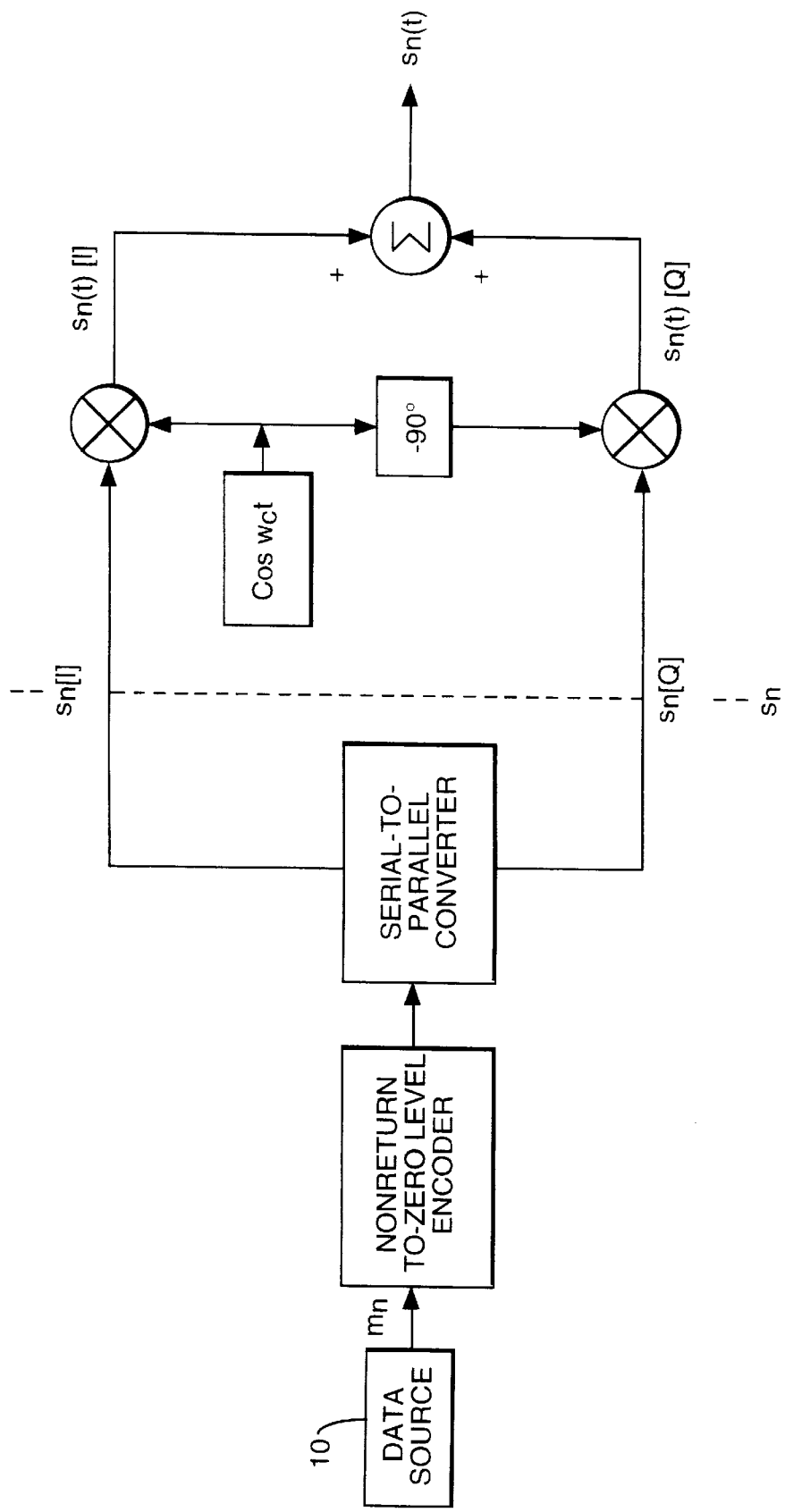
FIG. 2 is a diagram of a prior art QPSK transmitter.
Figure 3:
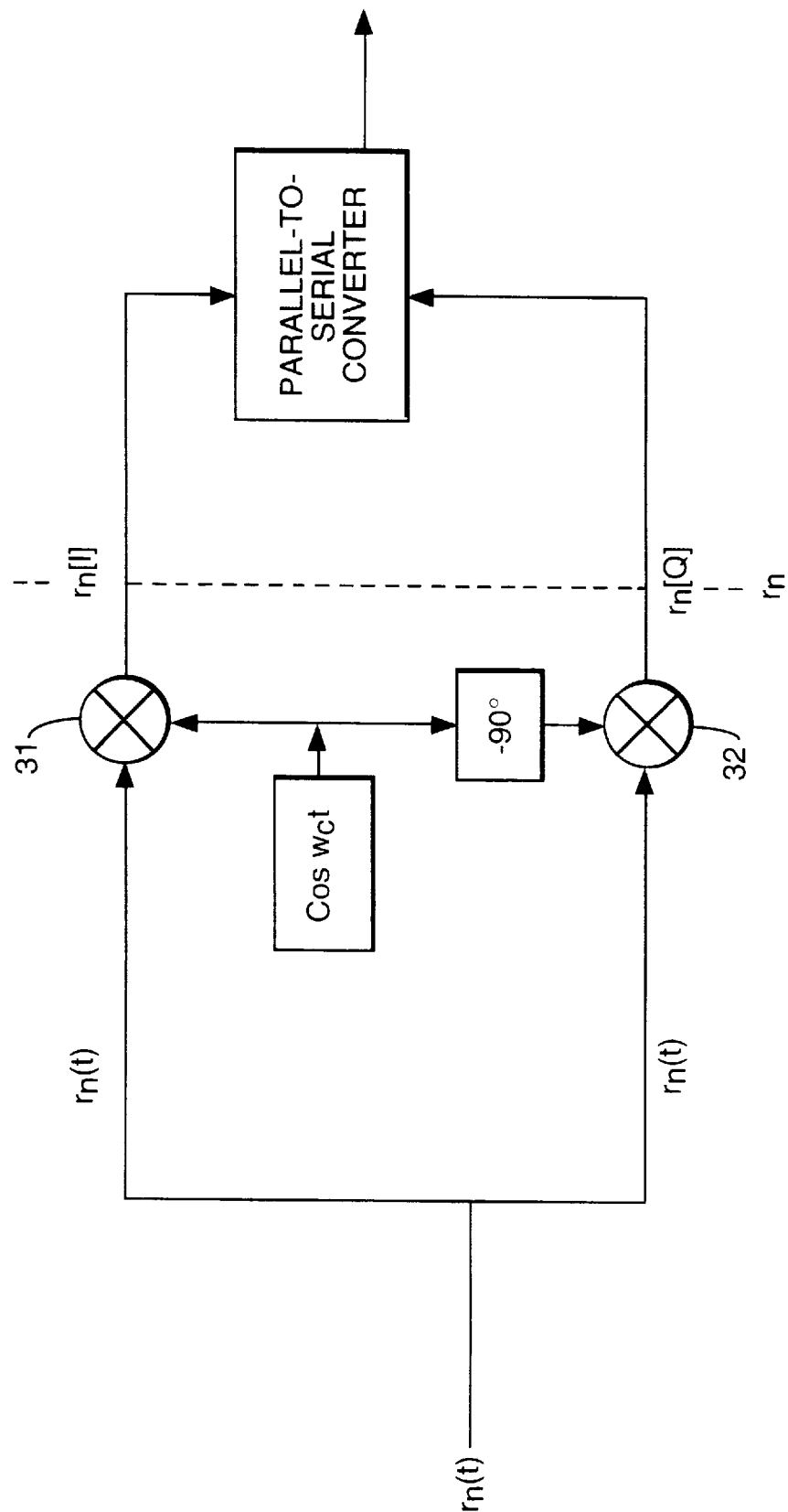
FIG. 3 is a diagram of a prior art QPSK receiver.
Figure 4:
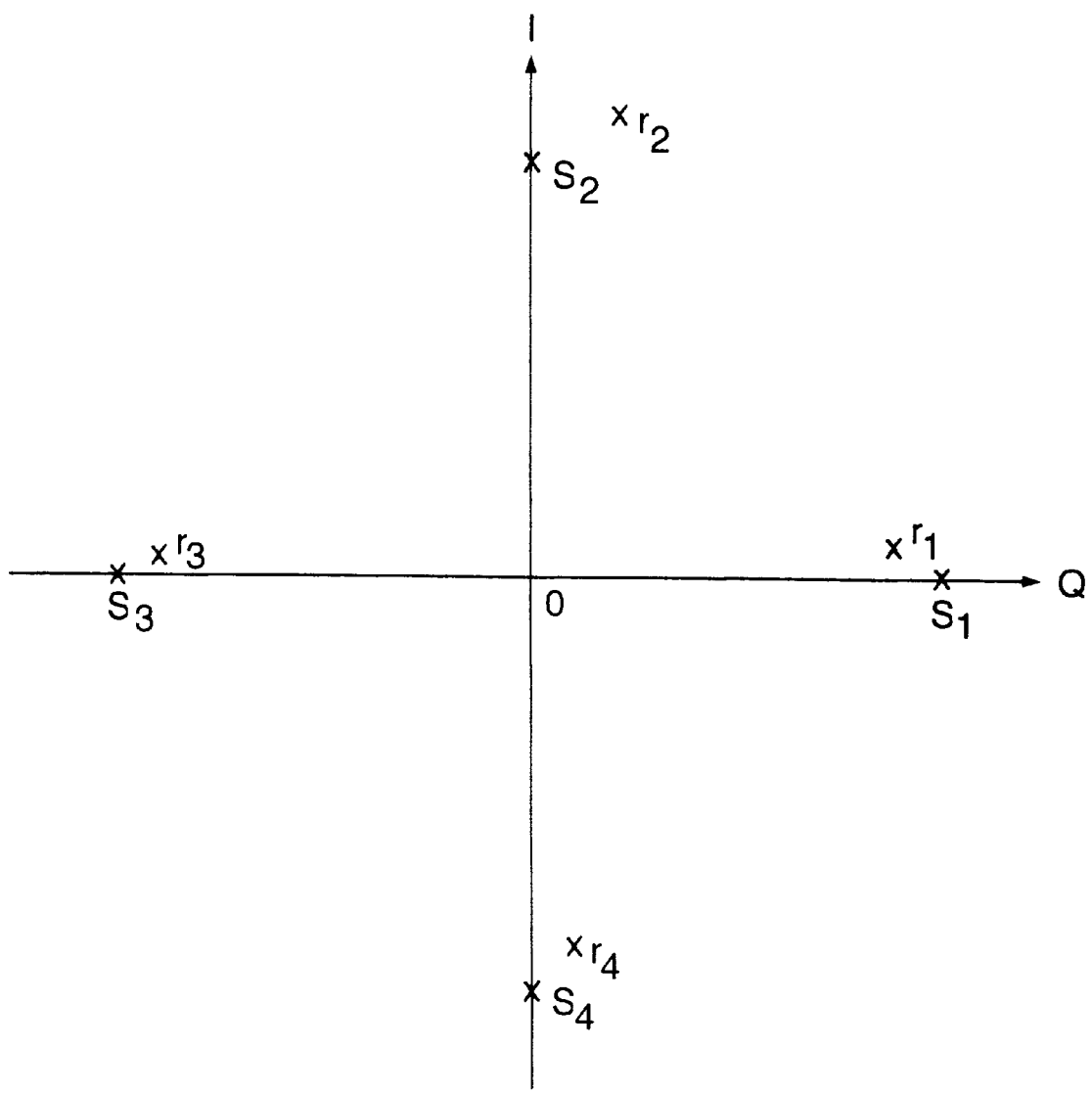
FIG. 4 is a signal space diagram for a QPSK system.

Referring to FIGS. 2 and 3 there is shown a transmitter and receiver designed to operate in a QPSK digital passband transmission system. The transmitter includes signals $s_n[I]$ and $s_n[Q]$ which define the constellation point $s_n$. The receiver includes signals $r_n[I]$ and $r_n[Q]$ which define the received signal point $r_n$. As the I and Q components of the signals Sn and rn are on orthogonal axis it is convenient to represent the signals sn and rn as complex numbers, with the I component corresponding to the real part of the complex number, and the Q component corresponding to the imaginary part of the complex number.

Figure 5:
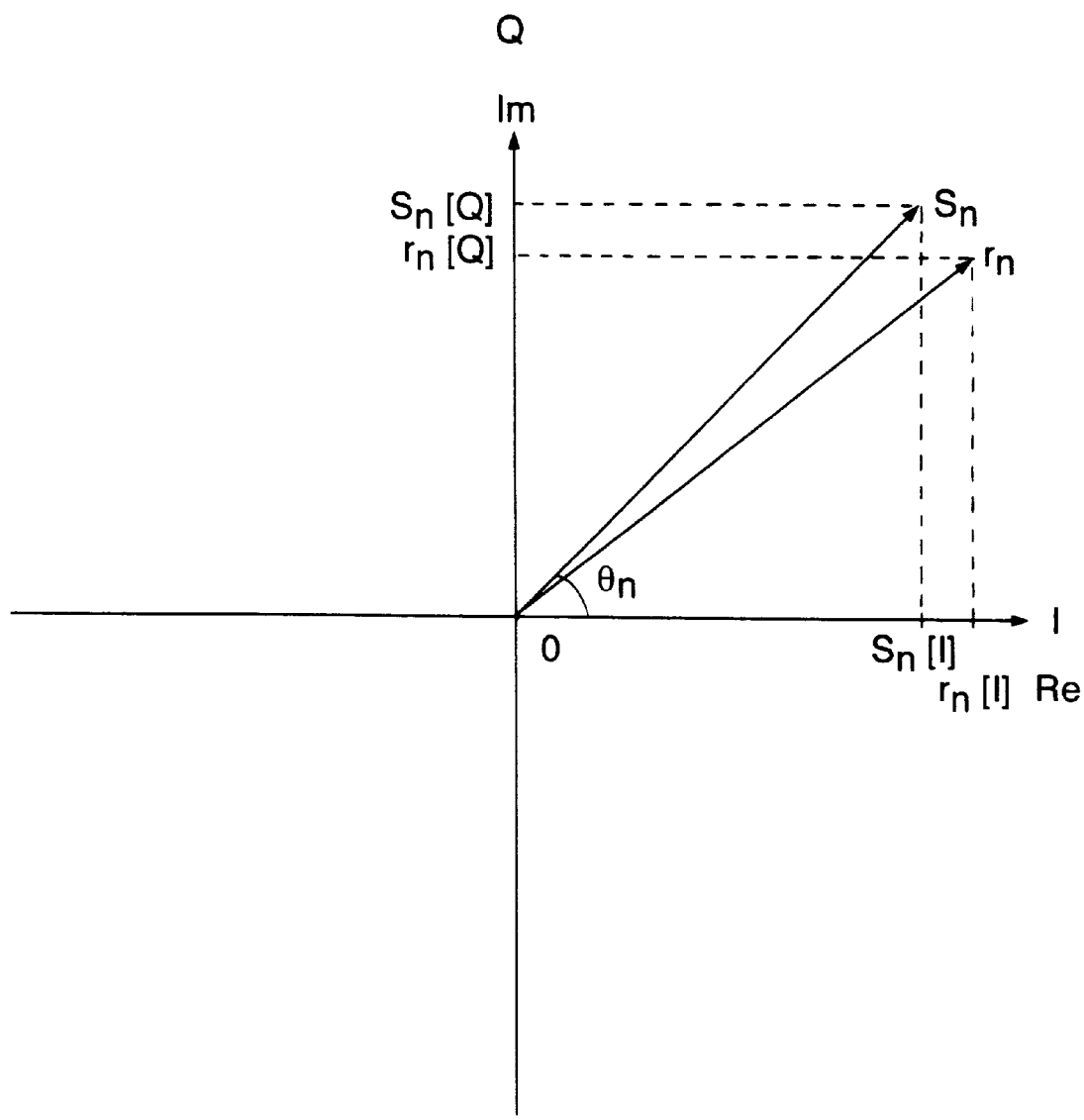
FIG. 5 is a signal space diagram for a digital passband transmission system incorporating the QPSK modulation scheme showing a received signal point and an associated constellation point.

FIG. 5 shows a single received signal point rn and its associated constellation point $s_n$, plotted in the complex plane. In accordance with the invention the relationship between the constellation point and the received signal point may be modelled in the following way:

$$r_n = G s_n e^{i\psi} + u + \epsilon_n \quad 1)$$

where

G is the gain of the system.

$\psi$ is a systematic error resulting from a phase offset.

u is a systematic error resulting from a complex DC offset.

$\epsilon_n$ is a complex random error resulting from noise in the system.

Rearranging equation 1), the complex random error is expressed in the following equation:

$$\epsilon_n = r_n - G s_n e^{i\psi} - u$$

In the QPSK modulation scheme the signal constellation has constellation points which lie on a circle in the complex plane, the circle being centred at the origin and having a unit radius. Therefore, each constellation point may be defined by its phase angle $\theta_n$ as in the following equation:

$$s_n = e^{i\theta_n} \quad 2)$$

The gain and the phase offset may be combined in a single complex variable A, such that:

$$A = G e^{i\psi}$$

Consequently the complex random error is now defined as:

$$\epsilon_n = r_n - A e^{i\theta_n} - u$$

The square of the magnitude of this random error is given by the following equation:

$$|\epsilon_n|^2 = (r_n - A e^{i\theta_n} - u)(\bar{r}_n - \bar{A} e^{-i\theta_n} - \bar{u})$$

By summing the square of the magnitude of the random error over the number of received signal points N the following equation is derived:

$$\sum_{n=0}^{N-1} |\epsilon_n|^2 = \sum_{n=0}^{N-1} (r_n - A e^{i\theta_n} - u)(\bar{r}_n - \bar{A} e^{-i\theta_n} - \bar{u}) = L(A, u, \bar{A}, \bar{u})$$

$L(A, u, \bar{A}, \bar{u})$ is the cost function for the system and in accordance with the invention in order to obtain the best estimate for the DC offset and the phase offset this cost function must be minimised. By minimising the cost function, the random errors and hence the noise are also minimised.

Minimising the cost function L with respect to $\bar{u}$ and $\bar{A}$:

$$\frac{\partial L}{\partial \bar{u}} = 0 \Rightarrow \sum_{n=0}^{N-1} (r_n - A e^{i\theta_n} - u) = 0 \quad 3)$$

$$\frac{\partial L}{\partial \bar{A}} = 0 \Rightarrow \sum_{n=0}^{N-1} (r_n - A e^{i\theta_n} - u) e^{-i\theta_n} = 0 \quad 4)$$

From 4):

$$\Rightarrow A = \frac{\sum_{n=0}^{N-1} (r_n e^{-i\theta_n} - u e^{-i\theta_n})}{N}$$

Substituting A in 3):

$$\sum_{n=0}^{N-1} \left( r_n - \left( \frac{1}{N} \sum_{m=0}^{N-1} (r_m e^{-i\theta_m} - u e^{-i\theta_m}) \right) e^{i\theta_n} - u \right) = 0$$

$$\Rightarrow N \sum_{n=0}^{N-1} r_n - \sum_{n=0}^{N-1} \sum_{m=0}^{N-1} r_m e^{-i(\theta_m - \theta_n)} + \sum_{n=0}^{N-1} \sum_{m=0}^{N-1} u e^{-i(\theta_m - \theta_n)} - N \sum_{n=0}^{N-1} u = 0$$

$$\Rightarrow u \left( N^2 - \sum_{n=0}^{N-1} \sum_{m=0}^{N-1} e^{-i(\theta_m - \theta_n)} \right) = N \sum_{n=0}^{N-1} r_n - \sum_{n=0}^{N-1} \sum_{m=0}^{N-1} r_m e^{-i(\theta_m - \theta_n)}$$

-continued $$u = \frac{N\sum_{n=0}^{N-1} r_n - \sum_{n=0}^{N-1}\sum_{m=0}^{N-1} r_m e^{-i(\theta_m - \theta_n)}}{N^2 - \left|\sum_{n=0}^{N-1} e^{i\theta_n}\right|^2}$$

Using equation 2):

$$u = \frac{N\sum_{n=0}^{N-1} r_n - \sum_{n=0}^{N-1} r_n \bar{s}_n \sum_{n=0}^{N-1} s_n}{N^2 - \left|\sum_{n=0}^{N-1} s_n\right|^2} \quad 5)$$

Solving for A:

$$A = \frac{1}{N}\sum_{n=0}^{N-1} r_n \bar{s}_n - \frac{1}{N} u \sum_{n=0}^{N-1} \bar{s}_n$$

Substitute for u:

$$A = \frac{1}{N}\sum_{n=0}^{N-1} r_n \bar{s}_n - \frac{1}{N}\left(\frac{N\sum_{n=0}^{N-1} r_n - \sum_{n=0}^{N-1} r_n \bar{s}_n \sum_{n=0}^{N-1} s_n}{N^2 - \left|\sum_{n=0}^{N-1} s_n\right|^2}\right)\sum_{n=0}^{N-1} \bar{s}_n$$

$$\Rightarrow A = \frac{1}{N}\sum_{n=0}^{N-1} r_n \bar{s}_n - \frac{N\sum_{n=0}^{N-1} r_n \sum_{n=0}^{N-1} \bar{s}_n - \left|\sum_{n=0}^{N-1} s_n\right|^2 \sum_{n=0}^{N-1} r_n \bar{s}_n}{N\left(N^2 - \left|\sum_{n=0}^{N-1} s_n\right|^2\right)}$$

Let $\sum_{n=0}^{N-1} r_n \bar{s}_n = a$, and $\sum_{n=0}^{N-1} s_n = b$:

$$A = \frac{1}{N}a - \frac{\bar{b}N\sum_{n=0}^{N-1} r_n - a|b|^2}{N(N^2 - |b|^2)}$$

$$\Rightarrow A = \frac{aN^2 - a|b|^2 - \bar{b}N\sum_{n=0}^{N-1} r_n + a|b|^2}{N(N^2 - |b|^2)}$$

$$\Rightarrow A = \frac{aN^2 - \bar{b}N\sum_{n=0}^{N-1} r_n}{N(N^2 - |b|^2)}$$

$$\Rightarrow A = \frac{aN - \bar{b}\sum_{n=0}^{N-1} r_n}{N^2 - |b|^2}$$

$$A = \frac{N\sum_{n=0}^{N-1} r_n \bar{s}_n - \sum_{n=0}^{N-1} r_n \sum_{n=0}^{N-1} s_n}{N^2 - \left|\sum_{n=0}^{N-1} s_n\right|^2} \quad 6)$$

Thus equations 5) and 6) provide a complex estimate for the complex DC offset u and the complex variable A.

The DC offset for the I component $r_n[I]$ of the received signal point is given by Re (u).

The DC offset for the Q component $r_n[Q]$ of the received signal point is given by Im (u).

The phase offset is given by Arg (A).

The gain of the system is given by $|A|$.

In a mobile cellular telephone the calculation of the DC offsets, and/or the phase offset, and/or the gain may be achieved in base band using an algorithm operating in a digital signal processor of the cellular telephone. The values for the I and Q components of the received signal points $r_n[I]$ and $r_n[Q]$ may be buffered in an integrated circuit of the cellular telephone and fed to the digital signal processor when required by the algorithm.

According to the model of the transmission system defined in equation 1), the phase offset is constant over the estimation (summing) period. Therefore, in a preferred embodiment the DC offset estimation is carried out over 4 received signal points such that the estimation period is short enough for the phase offset to be assumed to be constant. The DC offset estimation is then repeated over successive sets of 4 received signal points to produce a set of DC offset estimations. These set of DC estimates are averaged to yield a final DC offset estimation. By calculating the phase offset for each set of 4 received signal points the variation of the phase offset with time can be determined which is equivalent to the frequency offset of the system.

Given a particular N, there is a finite number of possible sequences for the set of transmitted constellation points $s_n$. Consequently, the possible values for:

$$\sum_{n=0}^{N-1} s_n \quad \text{and} \quad \frac{1}{N^2 - \left|\sum_{n=0}^{N-1} s_n\right|^2}$$

found in the equations for u and A may be precalculated and stored as multiplicative factors in a look up table of the digital signal processor. The calculations for u and A may be performed faster in the digital signal processor using the look-up table as less computation is required.

Figure 6:
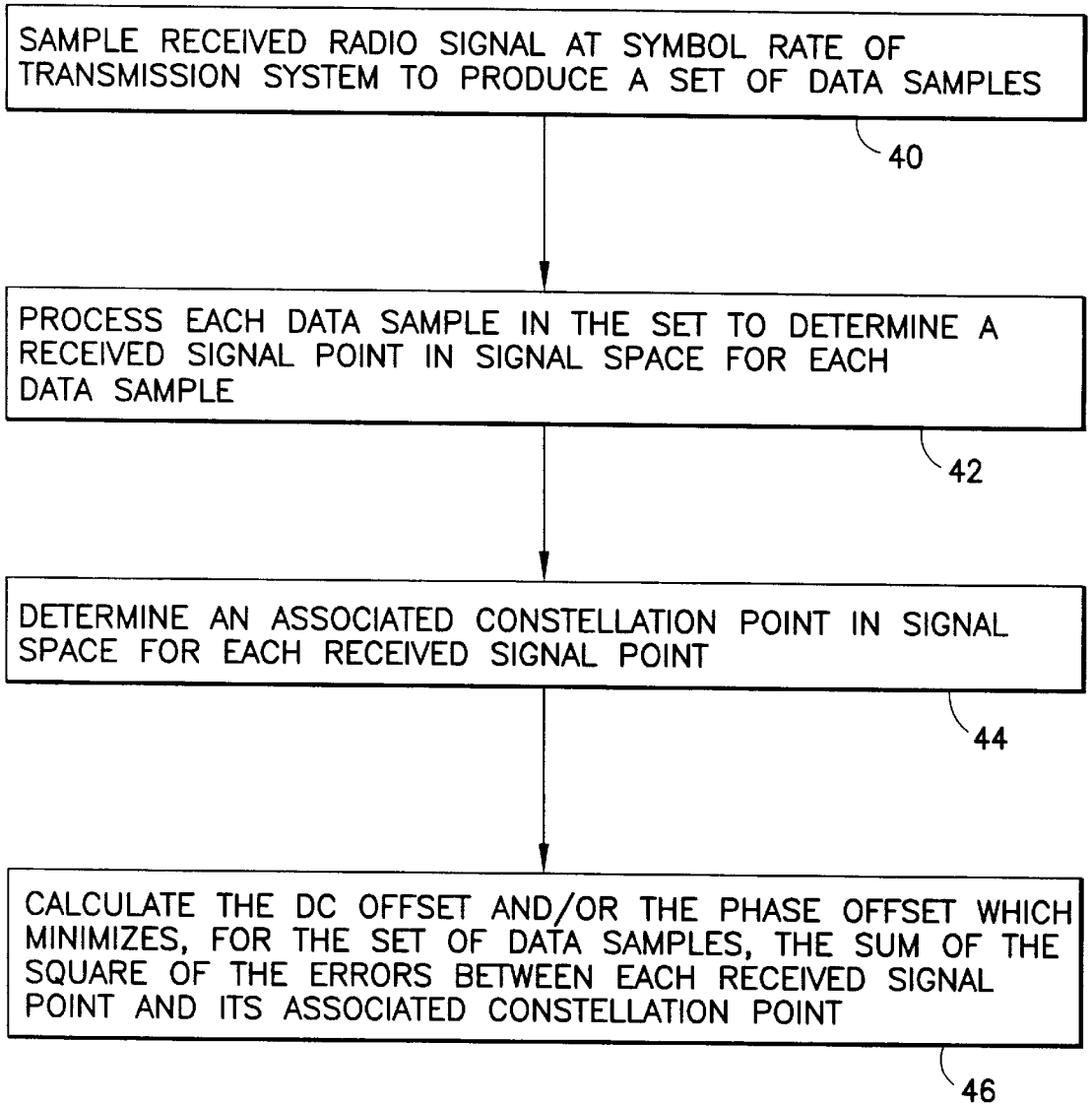
FIG. 6 is a generalized flow chart of the method according the invention—has been inserted.

FIG. 6 is a generalized flow chart of the invention where in step 40, a received radio frequency signal is sampled at the symbol rate of the transmission system to produce a set of data samples. In step 42, each data sample is processed in order to determine a received signal point in signal space for each data sample. In step 44, an associated constellation point in signal space is determined for each received signal point. Finally, in step 46, the DC offset and/or phase offset which minimizes, for the set of data samples, the sum of the square of the errors between each received signal point and its associated constellation point is calculated.

With the DC offset and the phase offset estimated, the received signal points can be adjusted in accordance with equation 1) to eliminate the DC offset and the phase offset.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The present invention includes any novel feature or combination of features disclosed herein either explicitly or any generalisation thereof irrespective of whether or not it relates to the claimed invention or mitigates any or all of the problems addressed.

What is claimed is:

1. A method of estimating a DC offset and a phase offset for a radio receiver operable in a digital passband transmission system, the method comprising;
   sampling a received radio signal at the symbol rate of the transmission system to produce a set of data samples,
   processing each data sample in the set in order to determine a received signal point in signal space for each data sample,
   determining an associated constellation point in signal space for each received signal point,
   calculating using a digital processor the DC offset and the phase offset which minimises, for the set of data samples, the sum of the square of the errors between each received signal point and said associated constellation point.

2. A method as claimed in claim 1, wherein the radio receiver is a phase-shift keying radio receiver.

3. A method as claimed in claim 1, wherein the step of processing comprises processing each data sample using a bank of correlators.

4. A method as claimed in claim 3, wherein the bank of correlators have a common input and the resultant correlator outputs define the received signal points.

5. A method as claimed in claim 3, wherein the bank of correlators comprise an in-phase I correlator and a quadrature Q correlator.

6. A method as claimed claim 1, wherein the radio receiver is a quadrature phase-shift keying radio receiver.

7. A method as claimed in claim 1, wherein prior knowledge of information present in the received radio signal is used to determine said associated constellation point for each received signal point.

8. A method as claimed in claim 1, wherein a decision aided process is used to determine said associated constellation point for each received signal point.

9. A method of estimating a DC offset for a radio receiver operable in a digital passband transmission system, the method comprising;
   sampling a received radio signal at the symbol rate of the transmission system to produce a set of data samples,
   processing each data sample in the set, in order to determine a received signal point in signal space for each data sample,
   determining an associated constellation point in signal space for each received signal point,
   calculating using a digital processor, the DC offset which minimises, for the set of data samples, the sum of the square of the errors between each received signal point and said associated constellation point.

10. A method as claimed in claim 9, wherein the radio receiver is a phase-shift keying radio receiver.

11. A method as claimed in claim 9, wherein the step of processing comprises processing each data sample using a bank of correlators.

12. A method as claimed in claim 11, wherein the bank of correlators have a common input and the resultant correlator outputs define the received signal points.

13. A method as claimed in claim 11, wherein the bank of correlators comprise an in-phase I correlator and a quadrature Q correlator.

14. A method as claimed in claim 9, wherein the radio receiver is a quadrature phase-shift keying radio receiver.

15. A method as claimed in claim 9, wherein prior knowledge of information present in the received radio signal is used to determine said associated constellation point for each received signal point.

16. A method as claimed in claim 9, wherein a decision aided process is used to determine said associated constellation point for each received signal point.

17. A method of estimating a phase offset for a radio receiver operable in a digital passband transmission system, the method comprising;
   sampling a received radio signal at the symbol rate of the transmission system to produce a set of data samples,
   processing each data sample in the set in order to determine a received signal point in signal space for each data sample,
   determining an associated constellation point in signal space for each received signal point,
   calculating using a digital processor the phase offset which minimises, for the set of data samples, the sum of the square of the errors between each received signal point and said associated constellation point.

18. A method as claimed in claim 17, wherein the radio receiver is a phase-shift keying radio receiver.

19. A method as claimed in claim 17, wherein the step of processing comprises processing each data sample using a bank of correlators.

20. A method as claimed in claim 19, wherein the bank of correlators have a common input and the resultant correlator outputs define the received signal points.

21. A method as claimed in claim 19, wherein the bank of correlators comprise an in-phase I correlator and a quadrature Q correlator.

22. A method as claimed in claim 17, wherein the radio receiver is a quadrature phase-shift keying radio receiver.

23. A method as claimed in claim 17, wherein prior knowledge of information present in the received radio signal is used to determine said associated constellation point for each received signal point.

24. A method as claimed in claim 17, wherein a decision aided process is used to determine said associated constellation point for each received signal point.

25. A method of estimating a DC offset for a radio receiver operable in a digital passband transmission system, comprising:
   calculating with a processor;

$$u = \frac{N\sum_{n=0}^{N-1} r_n - \sum_{n=0}^{N-1} r_n \bar{s}_n \sum_{n=0}^{N-1} s_n}{N^2 - \left|\sum_{n=0}^{N-1} s_n\right|^2}$$

where u represents the DC offset, $r_n$ represent an set of received signal points corresponding to a received signal sampled at the symbol rate, $s_n$ represent a set of constellation points associated with the set of received signal points, and N is the number of samples performed on the received signal; and
   using the DC offset which is computed to correct the received signal.

26. A method of estimating a phase offset for a radio receiver operable in a digital passband transmission system comprising:

calculating with a processor;

$$\psi = \text{Arg}\left[\frac{N\sum_{n=0}^{N-1} r_n \bar{s}_n - \sum_{n=0}^{N-1} r_n \sum_{n=0}^{N-1} s_n}{N^2 - \left|\sum_{n=0}^{N-1} s_n\right|^2}\right]$$

where $\Psi$ is a angle representing the phase offset, $r_n$ represents an set of received signal points corresponding to a received signal sampled at the symbol rate, $s_n$ represents an set of constellation points associated with a set of received signal points, and N is the number of samples performed on the received signal; and using the DC offset which is computed to correct the received signal.

* * * * *

UNITED STATES PATENT AND TRADEMARK OFFICE
CERTIFICATE OF CORRECTION

PATENT NO. : 6,259,748 B1
DATED : July 10, 2001
INVENTOR(S) : Yim et al.

It is certified that error appears in the above-identified patent and that said Letters Patent is hereby corrected as shown below:

Title page,
Inventor, Terence Yim's address, "Guildford" should read -- Surrey --. Albert Lobo's address, "Windsor" should read -- Berkshire --.

Column 9, claim 1,
Line 22, after "processor", insert -- , --.

Column 10, claim 25,
Line 60, "represent an set" should read -- represent a set --.

Column 12, claim 26,
Lines 2 and 4, "represent an set" should read -- represent a set --.

Signed and Sealed this

Ninth Day of April, 2002

*Attest:*

*Attesting Officer*

JAMES E. ROGAN
*Director of the United States Patent and Trademark Office*